United States Patent Office 3,606,908
Patented Sept. 21, 1971

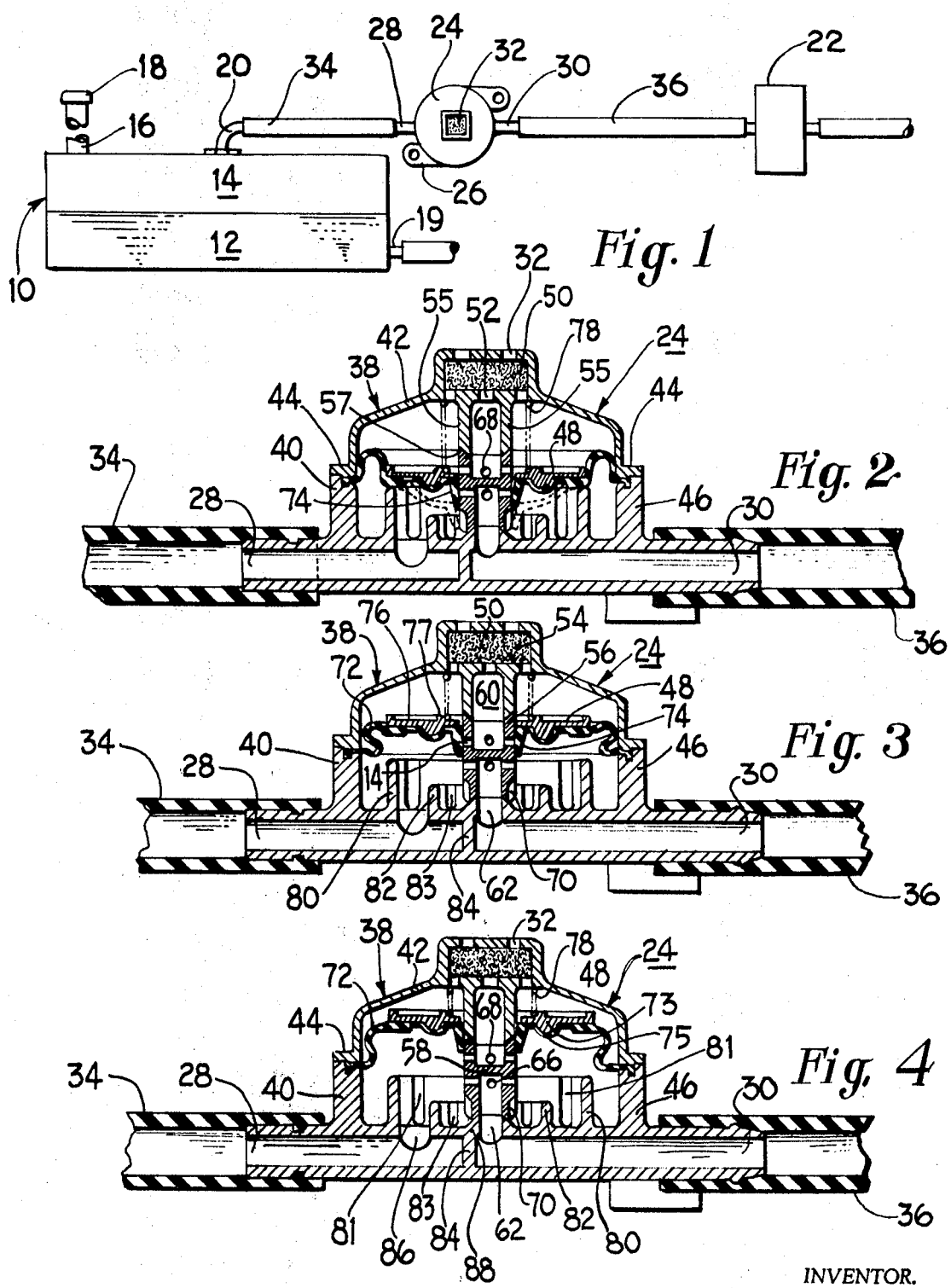

3,606,908
VENTILATION SYSTEM FOR VOLATILE FLUID
William C. Riester, Williamsville, N.Y., assignor to
Trico Products Corporation, Buffalo, N.Y.
Filed Nov. 26, 1969, Ser. No. 880,207
Int. Cl. F16k *17/196*
U.S. Cl. 137—116
8 Claims

ABSTRACT OF THE DISCLOSURE

A system for storing volatile materials and disposing of excess vapors and overflow includes a reservoir which may be, for example, a gasoline tank for an automobile, and filtering apparatus connected to the reservoir through a multidirectional valve assembly employing a pressure differential actuated apertured diaphragm having a lip circumscribing the aperture which serves as a valve element slidable on a tubular valve seat. The valve is spring biased to a neutral position sealing the tank outlet and remains in that position when the pressure in the storage tank is such that the tank can contain the vapors. When ambient conditions are such as to cause expansion of the fluid and the vapor the diaphragm and valve move to an open position for permitting the vapor or overflow fluid to flow through filtering and disposable apparatus. If the filter or any of the lines leading thereto or therefrom become clogged, or if pressure increases in the tank at a rate which causes an increase of pressure on the diaphragm, a second aperture is opened to permit venting to atmosphere. If subatmospheric pressure conditions exist in the reservoir the diaphragm is drawn to a position overlying conduits on the external wall of the tubular valve seat to permit venting to the atmosphere for pressure equalization.

BACKGROUND OF THE INVENTION

The invention relates to improvements for ventilation valves and more particularly to a multidirectional valve assembly which utilizes a single pressure actuated valve element for directing fluid, selectively, in response to varying pressure conditions within the system to one of a plurality of outlets.

For tanks or reservoirs holding volatile fluids it is essential to provide a means for venting to atmosphere and for escape of vapors or overflow due to varying ambient condtions when either excessive pressure tending to burst the tank or subatmospheric pressure which may cause implosion can occur. In tanks of this type, as for example fuel tanks for motor vehicles, it has been the practice to provide a vent hole in the filler closure cap. It has been found that escape of raw gasoline vapors and overflow gasoline contribute heavily to the air pollution problem by releasing irritating air contaminants. Because of the serious air pollution problem prevalent it has become essential to provide a sealed closure cap for the gasoline tanks and to provide means for permitting the vapors to be redirected to the engine for complete combustion, thus eliminating the emanation of raw gasoline into the air.

It is necessary to filter these vapors and overflow gasoline prior to directing them to the engine. Because the filter apparatus and/or the conduits leading to the engine may become clogged or the rate of pressure increase in the tank may become excessive it is necessary to provide valving for alternate venting to the atmosphere under such emergency conditions. It is also essential to provide venting to the atmosphere because it is possible under certain ambient conditions for a vacuum to be created in the tank with an ensuant risk of implosion.

To provide for these contingencies it has been proposed to utilize three separate valves: (1) a valve responsive to subatmospheric valve pressure for venting to the atmosphere; (2) a valve for venting in case of excessive pressures; and (3) a valve for directing the vapors to the engine under normal conditions of vapor pressure in a range in excess of that which the tank will contain. This introduces additional components into the system which are themselves a cost factor and also introduces a costly and time consuming assembly procedure.

SUMMARY OF THE INVENTION

A valve assembly of the present invention incorporates these three functions utilizing a single valve element in a multidirectional valve assembly which is economical and efficient.

It is a principal object of this invention to provide a simple and economical unitized multidirectional valve assembly for directing vapors and overflow from volatile fluids from a reservoir to one of a plurality of outlets in which the selection of outlets is responsive to pressure conditions in the system.

Other objects and advantages of the invention will be apparent from the following detailed description taken in connection with the accompanying drawings.

DESCRIPTION OF THE DRAWINGS

FIG. 1 is a schematic diagram of a portion of a vapor pressure release system embodying the invention.

FIGS. 2, 3 and 4 are sectional views of the valve assembly utilized in this invention showing the position of the valve under varying pressure conditions.

DESCRIPTION OF THE PREFERRED EMBODIMENT

In FIG. 1 there is shown diagramatically a motor vehicle fuel tank 10 partially filled with gasoline 12 or other volatile, flammable material and vapor 14 in the unfilled space. The tank includes a filler tube 16 having a sealable closure cap 18, a fluid outlet 19, and a disposal outlet 20 for permitting escape of vapor 14. The disposal outlet 20 is connected to filtering apparatus 22 of any suitable or desirable type through a multidirectional valve assembly 24 having mounting brackets 26 for securement to a motor vehicle in any suitable or desirable manner as by bolting (not shown) in any suitable or desirable location. The valve includes a fluid inlet 28 and fluid outlets 30 and 32. Fluid outlet 32 is shown as an atmospheric vent. The inlet 28 is connected to the disposal outlet 20 of the tank 10 by a conduit 34. The fluid outlet 30 is connected to filtering apparatus 22 by a conduit 36. The filtering apparatus 22 may be in turn connected to a suitable inlet on the vehicle engine (not shown) to permit burning of the excess vapor or overflow gasoline.

The valve assembly 24 comprises a housing 38 formed of a base 40 and a substantially bell-shaped top shell 42. The top shell 42 includes peripheral radial flange 44 which seats on the edge of a peripheral wall 46 of the base 40 with an apertured diaphragm assembly 48 having its periphery clamped between the peripheral flange 44 and the edge of the circumferential wall 46. The junction between the top shell 42 and the base 40 is sealed.

The top shell 42 includes a filter chamber 50 having outlets 32 on its exterior wall and openings 52 on its interior wall and includes a filter pad 54 enclosed therein. The filter pad 54 may be of felt or other suitable porous material. A hollow tubular element 55 depends from the filter chamber 50 and is in communication therewith through aperture 52. The tubular element 55 is chamfered at its free end as at 57.

The base or lower body 40 of the housing 48 includes the outer circumferential wall 46 and inner circumferential walls 80 and 82 concentric with the outer wall 46. The circumferential walls 80 and 82 include a plurality of circumferentially spaced, axially extending interruptions 81 and 83 respectively. Walls 80 and 82 are of descending height respectively. Inlet port 28 and outlet port 30 are formed on the lower body 40 and are separated by a wall 84 so as to interrupt communication between them. An opening 86 in the base 40 between walls 80 and 82 communicates with the inlet port 28. The outlet port 30 terminates substantially centrally of the base 40 in an exteriorly chamfered hollowed cylindrical post 88.

An open-ended, hollow tubular valve seat element 56, interiorly chamfered at each end and having a wall or divider 58 located substantially centrally between its ends, is disposed in compression between the depending tubular element 55 and the post 88. The chamfered ends of the valve seat element 56 meet with the chamfered ends of the tubular element 55 and post 88 to form air tight joints. The wall or divider 58, together with the depending tubular element 55, forms an upper tubular chamber 60 communicating with the filter chamber 50 through openings 52 and thence with the atmosphere through openings 32. The wall or divider 58, together with the post 88, forms a port 62 communicating with the outlet port 30. A first set of radial openings 66 in the valve seat element 56 communicate with port 62 and a second set of radial openings 68 communicates with chamber 60. A set of circumferentially disposed longitudinal conduits or fluted formations 70 are formed on the outer wall of the valve seat element 56 at its end which engages the post 88.

The apertured diaphragm assembly 48 includes an elastomeric, convoluted diaphragm 72 having a lip 74 circumscribing the aperture and receiving the tubular valve seat 56 in sealing engagement, the lip 74 constituting a valve element. A relatively rigid diaphragm backing plate 76 having a central opening complementary with the central opening in the diaphragm 72 overlies the central areas of the diaphrgam 72 and includes a circumferential spring retaining rib 77 centrally thereof. The backing plate 76 is retained in position against the diaphragm by a coil spring 78 disposed between the inner wall of the chamber 50 and the backing plate 76. The backing plate is further retained in position by a circumferential rib 73 and mating convolution 75 in the diaphragm 72.

In operation, when the pressure in tank 10 is within a normal range so that no vapor seeks to escape under pressure the spring 78 biases the diaphragm 72 against the circumferential wall 80 to the neutral position shown in full line in FIG. 2, thus sealing off the tank 10 by sealing tthe first openings 66. The wall 80 serves as a stop. The interruptions 81 permit the pressure to act on the entire diaphragm surface. When the pressure in the tank 10 reaches a preselected value, controlled by the selection of the tension of spring 78, the diaphragm assembly 48 will move to a first position illustrated in FIG. 3 wherein the vapor or overflow gas will flow through conduit 34, inlet port 28, aperture 86, radial openings 66 and port 62 to the filter apparatus 22 through outlet port 30 and conduit 36. If the pressure becomes excessive due to clogging of the filter apparatus or passages thereto or therefrom, the diaphragm will compress the spring 78 further and move to a third position shown in FIG. 4, exposing the openings 66 in port 62 and the openings 68 to chamber 60 to permit venting of the tank 10 to atmosphere through conduit 34, inlet port 28, openings 68 in valve seat element 56, chamber 60, openings 52, filter 54 and vent openings 32. Likewise vapor in outlet 30 will flow through the vent 32 through port 62, openings 66, lower valve body 40, openings 68, chamber 60, and out through filter 54.

If the ambient conditions should be such as to create a vacuum in the reservoir or tank 10, air at atmospheric pressure will bleed into the tank through atmospheric vent 32 in the following manner. The vacuum will draw the diaphragm 72 to the dotted line position shown in FIG. 2 where the inner circumferential wall 82 will serve as a stop. The air will bleed through filter 54, openings 52 in the vent chamber 50 through longitudinal conduits formed by flutes 70, thence through interruptions 83, opening in wall 82 to 86, inlet 28 in conduit 34 to the tank 10. Interruptions 83 serve to prevent vacuum locking of the diaphragm.

It is thus apparent that a unique vent valve has been provided which will safely and efficiently provide an escape passage for vapors under excessive pressure in a storage tank for volatile fluids. The valve and the venting system also provide means for equalizing the pressure within the storage tank should subatmospheric pressure be created within the tank due to ambient conditions, thereby preventing implosion. Although the invention has been shown and described embodied in a fuel supply system for a motor vehicle it will of course be understood that various other embodiments and modifications may be possible in accordance with the broader aspects of the invention. The system could be embodied in storage tanks for other volatile materials and may be employed for directing fluids to various outlets on a pressure selective basis. Additional outlets in valve openings may be provided to respond to a greater number of pressure ranges. The system need not be limited to a fuel supply system for motor vehicles.

Thus it should be understood that although a certain specific embodiment of the invention has been shown and described for the purpose of illustration, it will of course be apparent that the invention is not limited to the embodiment illustrated and described, but in its broadest aspects it includes all equivalent embodiments and modifications which come within the scope of the invention.

What is claimed is:

1. A multidirectional valve assembly for directing fluid flow from a fluid source through at least one of a plurality of fluid outlets in response to variable pressure conditions comprising a housing having a fluid inlet, and a plurality of fluid outlets, a valve seat comprising a hollow tube having a plurality of sets of radial apertures, each aperture being in communication with one of said outlets, a valve element comprising a pressure responsive elastomeric diaphragm having a central aperture and a peripheral lip circumscribing said aperture and slidable on said hollow tube in response to pressure variations within the valve housing for controlling communication between said fluid inlet and said fluid outlets.

2. A multidirectional valve assembly according to claim 1 wherein one of said fluid outlets is vented to atmosphere.

3. A multidirectional valve assembly according to claim 1 wherein one of said fluid outlets communicates with a fluid conduit for transporting fluid from a fluid source to a subsequent element in a fluid system.

4. A multidirectional valve assembly according to claim 1 including circumferentially spaced flutes forming conduits on the surface of said hollow tube for effecting communication between one of said fluid outlets and said fluid source.

5. A multidirectional valve assembly according to claim 1 wherein said diaphragm is responsive to a predetermined positive pressure differential to move to a position for effecting communication between said fluid source and one of said fluid outlets and to a predetermined negative pressure differential to move to another position for effecting communication between said fluid source and said one of said fluid outlets.

6. A multidirectional valve assembly according to claim 1 wherein said diaphram is responsive to pressure variations to move to a position for effecting communication between one of said fluid outlets and another of said fluid outlets.

7. A multidirectional valve assembly according to claim 1 wherein said diaphragm is responsive to pressure variations to move to a position for effecting communication between one of said fluid outlets and another of said fluid outlets and between said fluid source and one of said fluid outlets concurrently.

8. In a storage and disposal system for storing volatile materials and disposing of excess vapors and overflow comprising a storage reservoir having a filler opening and sealable closure means therefor, a disposal outlet, disposal apparatus, and conduit means connecting said disposal outlet and said disposal apparatus; a multidirectional valve assembly disposed in said conduit comprising a housing having atmospheric venting means, inlet means for communicating with said reservoir, outlet means for communicating with said disposal apparatus and atmospheric vent means, a tubular valve seat communicating with said atmospheric vent and said outlet means, divider means disposed within said valve seat for interrupting communication between said outlet means and said inlet means, said tubular valve seat having first radial openings in the side wall thereof, communicating with said inlet means and with said outlet means through said tubular means, second radial openings communicating with said inlet means and with said atmospheric vent through said tubular means and longitudinally extending conduit means formed on the exterior surface of the side walls of said tubular valve seat, an apertured diaphragm having circumferential lips circumscribing the aperture and slidably receiving said tubular valve seat in sealing engagement, said diaphragm lips being slidable from a first position for sealing said first and second openings from said inlet means in response to a first pressure condition with the system to a second position for exposing said first radial apertures to said inlet means in response to a second pressure condition within said system, to a third position for exposing said first and second radial openings in response to a third pressure condition within said system and to a fourth position overlying said longitudinally extending conduits in response to a fourth pressure condition within said system.

References Cited

UNITED STATES PATENTS

| | | | |
|---|---|---|---|
| 3,477,611 | 11/1969 | Niles | 220—86 |
| 2,391,790 | 12/1945 | Martinsson | 137—116 |
| 2,484,373 | 10/1949 | Brinkmann | 137—116 |
| 3,235,085 | 2/1966 | Humbert, Jr. | 137—116X |
| 3,334,748 | 8/1967 | Bozek | 210—132 |

ROBERT G. NILSON, Primary Examiner

U.S. Cl. X.R.

55—213; 137—118, 493, 587; 220—85VS